Feb. 1, 1966 L. C. GOSS ETAL 3,232,102
APPARATUS FOR DETERMINING THE CHARACTERISTICS OF BIASING DEVICES
Filed Oct. 17, 1962 2 Sheets-Sheet 2

INVENTORS
David W. Turner
BY & Lloyd C Goss

Hugh L. Fisher
ATTORNEY

United States Patent Office 3,232,102
Patented Feb. 1, 1966

3,232,102
APPARATUS FOR DETERMINING THE CHARACTERISTICS OF BIASING DEVICES
Lloyd C. Goss, St. Paul, Minn., and David W. Turner, Hales Corners, Wis., assignors to General Motors Corporation, Detroit, Mich., a corporation of Delaware
Filed Oct. 17, 1962, Ser. No. 231,128
5 Claims. (Cl. 73—161)

This invention relates to apparatus for determining the characteristics of biasing devices such as springs or other similar devices.

One of the more significant characteristics of any biasing device such as a spring is its rate, which is actually a measure of the stiffness of the spring. If the spring is a so-called linear spring, then it is deformed by changing its length. This deformation is usually designated in pounds per inch units. Hence, with a ten-lb. spring, a ten-lb. force or weight will produce one inch deflection in the length of the spring. If a torsional spring is being considered, the deformation is from rotation and, therefore, the rate corresponds to the applied moment or torque required for a certain angle of twist. The rate of a torsional spring is specified in inch-lbs. per radian units; thus, a 10-lb. torsional spring would require ten inch-lbs. of torque to produce one radian of twist.

Usually there is no problem involved in determining a spring's rate, this being a simple calculation since the effective mass or inertia of a spring is often negligible when compared with the load. But, if the spring is not of negligible mass or inertia, and its effective mass or inertia is not easily calculated, e.g. because the system in which the spring is installed requires portions of the spring to have the motion thereof restricted, it is difficult to determine the actual spring rate. Without knowing the actual spring rate, it becomes virtually impossible to predict how a system will respond to certain conditions except by trial and error techniques.

It is, therefore, one of the objectives of this invention to provide novel apparatus for accurately determining the rate of a biasing device, particularly those devices whose mass or inertia are not negligible and cannot be readily calculated. A related aim of the invention contemplates apparatus for determining a device's rate, which would otherwise not be readily calculated, by measuring the natural frequency of two mass systems, one of which includes a known mass or inertia and the other of which includes the unknown biasing device. With these two natural frequency values and the value of the known mass or inertia, the actual device rate then can be computed.

The invention provides novel apparatus incorporating principles that can be employed for determining the natural frequency of both linear and torsional biasing devices. By the apparatus and as a further aim of the invention, provision is made for vibrating the test device over a certain frequency spectrum so as to determine the frequency at which the impedance of the device is minimum. This frequency corresponds to the natural frequency of the device.

The foregoing and other objects and advantages of the invention will be apparent from the following description and from the accompanying drawings in which.

Figures 4A, 4B, 4C:
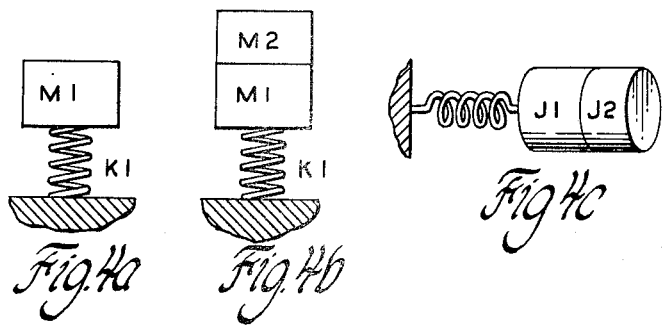
FIGURES 4a, 4b, and 4c are schematic diagrams of a spring system utilized to describe the theory involved in the invention.

In a simple spring mass system such as that shown in FIGURE 4a, the natural frequency in cycles per second is related either to the mass of the system if a linear spring is employed, or to the moment of inertia of the system if the spring is one of the torsional type. For example, the spring rate and the mass of the FIGURE 4a system have the following relationship to the natural frequency $f_{4a}$ of the spring mass system:

(1) $$f_{4a} = \frac{1}{2\pi}\sqrt{\frac{K_1}{M_1}}$$

Similarly in the FIGURE 4b system the natural frequency $f_{4b}$ is:

(2) $$f_{4b} = \frac{1}{2\pi}\sqrt{\frac{K_1}{M_1+M_2}}$$

With the torsion spring of the FIGURE 4c system, the natural frequency $f_{4c(2)}$ becomes:

(3) $$f_{4c(2)} = \frac{1}{2\pi}\sqrt{\frac{G_1}{J_1+J_2}}$$

where:

$K_1$ = the spring rate, lb./inches
$M_1$ and $M_2$ = the masses of the system $$\frac{lb.}{inch}sec.^2$$

$G_1$ = the spring rate, inch-lb./radian
$J_1$ and $J_2$ = inertias of the system, inch-lb.-sec.$^2$ From the Equations 1 and 2 the following Equations 4 and 5 are respectively derived:

(4) $$M_1 = \frac{K_1}{(2\pi f_{4a})^2}$$

(5) $$M_1 = \frac{K_1}{(2\pi f_{4b})^2} - M_2$$

Since the unknown mass $M_1$ has not changed and is common to Equations 4 and 5, these Equations 4 and 5 when equated provide:

(6) $$M_2 = \frac{K_1}{(2\pi f_{4b})^2} - \frac{K_1}{(2\pi f_{4a})^2}$$

Therefore, the spring rate $K_1$ for a linear spring equals:

(7) $$K_1 = \frac{M_2(2\pi f_{4a}f_{4b})^2}{f_{4a}^2 - f_{4b}^2}$$

In a similar manner, the spring rate $G_1$ for a torsional spring can be obtained and is equivalent to:

(8) $$G_1 = \frac{J_2[2\pi f_{4c(1)}f_{4c(2)}]^2}{f_{4c(1)}^2 - f_{4c(2)}^2}$$

where $f_{4c(1)}$ = the natural frequency of the FIGURE 4c system when only the inertia $J_1$ is used.

From Equations 7 and 8 it can be appreciated that the rate of a linear spring $K_1$ can be accurately computed if the natural frequency of the spring is first measured of a system such as that of FIGURE 4a, and secondly of a system such as that of FIGURE 4b where the known mass $M_2$ is added. Then by substituting the values of these frequencies in Equation 7 along with the value of the mass $M_2$, the rate $K_1$ can be determined.

Likewise, if one is concerned about the rate of a torsional spring, the natural frequency $f_{4c(1)}$ is measured first of a system in which the moment of inertia $J_1$ of a weight is not known. Next, a weight of known moment of inertia $J_2$ is added and the natural frequency $f_{4c(2)}$ of this system is ascertained. By substituting the values of $f_{4c(1)}$, $f_{4c(2)}$ and $J_2$ in Equation 8, the rate $G_1$ can be computed.

The foregoing method, therefore, comprehends the steps of (1) measuring the natural frequency with a spring in one system, (2) measuring the natural frequency with the spring in another system which includes a weight of known mass or inertia, and (3) the computation of the rate from either Equation 7 for a linear system or Equation 8 for a torsional system. Steps 1 and 2 are accomplished with the apparatus of FIGURES 1 and 2.

Figure 1:
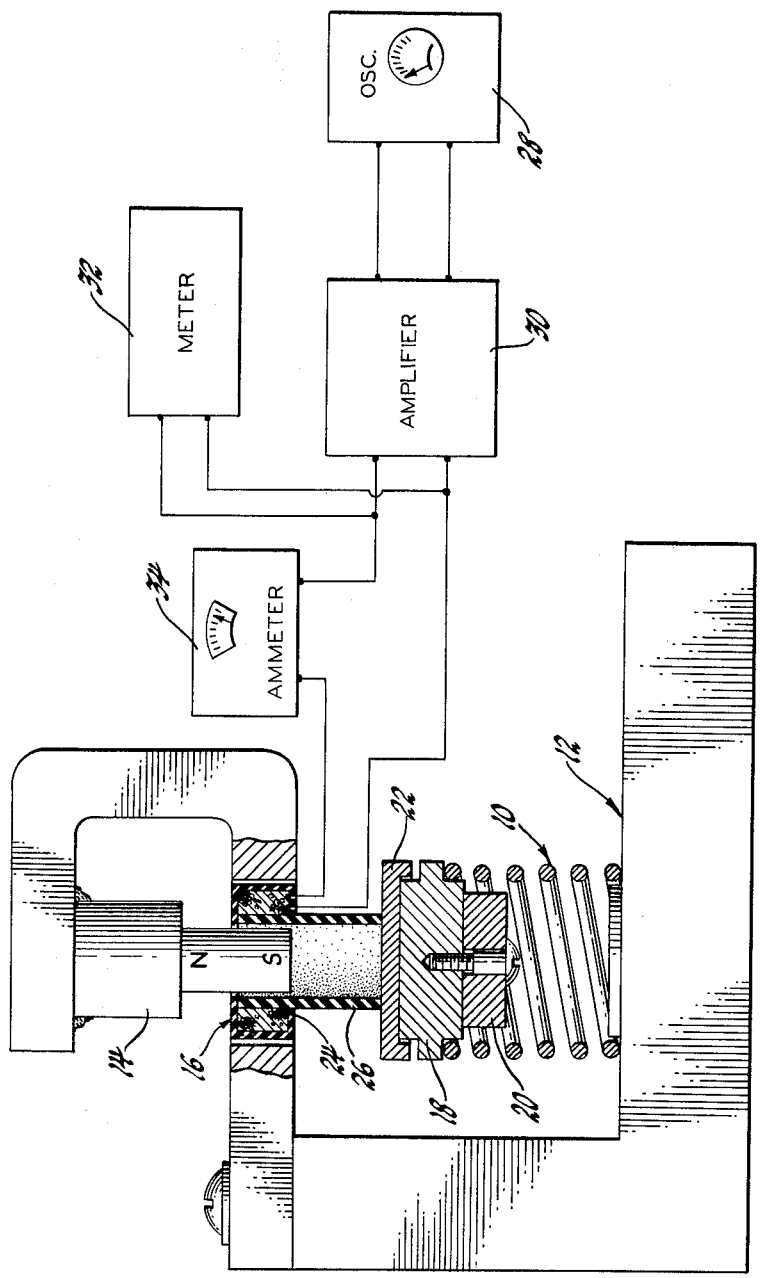
FIGURE 1 is a view of apparatus including a block diagram of the electrical circuitry for determining the natural frequency of a linear spring mass system.

Considering first FIGURE 1, the numeral 10 is used to designate a linear spring whose spring rate is to be determined. The spring 10 is positioned in the depicted way on a support 12 whose purpose and function is to provide a way of vibrating the spring 10 along its length at different frequencies. To do this, the support 12 has at the upper end thereof a permanent magnet 14. If the permanent magnet does not afford adequate magnetic forces, an electromagnet may be substituted therefor and energized by a D.C. source as in the FIGURE 2 apparatus, which will subsequently be described. The permanent magnet 14 through the intermediary of an electomagnet 16 and an adapter 18 on top of the spring 10 vibrates the spring 10 and at whatever frequency the electromagnet 16 is energized. The spring adapter 18 includes provision for attaching a weight 20 of known mass.

In the FIGURE 1 apparatus, the electromagnet 16 is movable relative to the permanent magnet 14 and includes a drive plate 22 in contact with the upper side of the spring adapter 18, a winding 24, and a spool 26. The spool 26 at the upper end has the winding 24 arranged thereon and at the lower end is attached to the drive plate 22. The permanent magnet 14 extends inside the spool 26 so that energization of the winding 24 by a pulse source will produce the mentioned relative motion therebetween.

The source of pulsating energizing current for the electromagnet winding 24 is an oscillator 28. The output from the oscillator 28 is increased if needed by an amplifier 30 before it is supplied to the winding 24. Also, the output frequency of the oscillator 28 may be varied over a frequency spectrum that is adequate for determining the natural frequency of the system shown using the spring 10, and is measured by an events per unit time meter 32. The amount of pulsating current supplied by the oscillator 28 is measured by an ammeter 34 interposed as depicted between the winding 24 and the amplifier 30. The pulsating current supplied to the winding 24 of the electromagnet 16 will cause the electromagnet 16 to vibrate and accordingly the spring 10 at the frequency of this pulsating current.

To measure the natural frequency of the spring 10 with the FIGURE 1 apparatus, the spring 10 is initially vibrated over the frequency spectrum of the oscillator 28 without the weight 20 attached to the spring adapter 18. When the system with the spring 10 is vibrating at its natural frequency, the spring's mechanical impedance will be minimum, whereas the electrical impedance of the winding 24 will be maximum. Accordingly, the current flow will be a minimum and the ammeter 34 will show a minimum or null reading. The frequency at which this null reading occurs can be read from the events per unit time meter 32. Next, the weight 20 is added to the spring adapter 18. Now, the natural frequency of the new system with the known weight 20 is ascertained in the just described way. The values of these two natural frequencies and the value of the weight 20 when substituted in Equation 7 will provide the exact rate of the spring 10.

Figure 2:
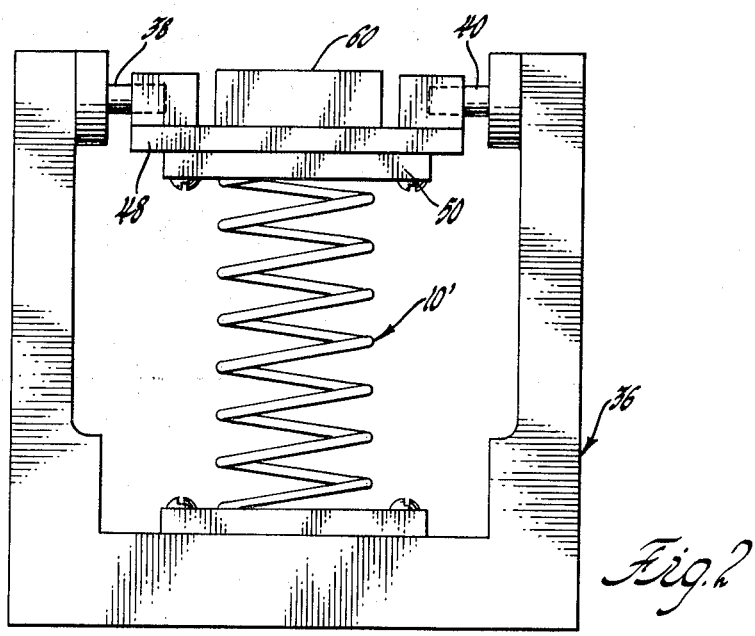
FIGURE 2 is a similar view of apparatus for ascertaining the natural frequency of a torsional spring mass system.
Figure 3:
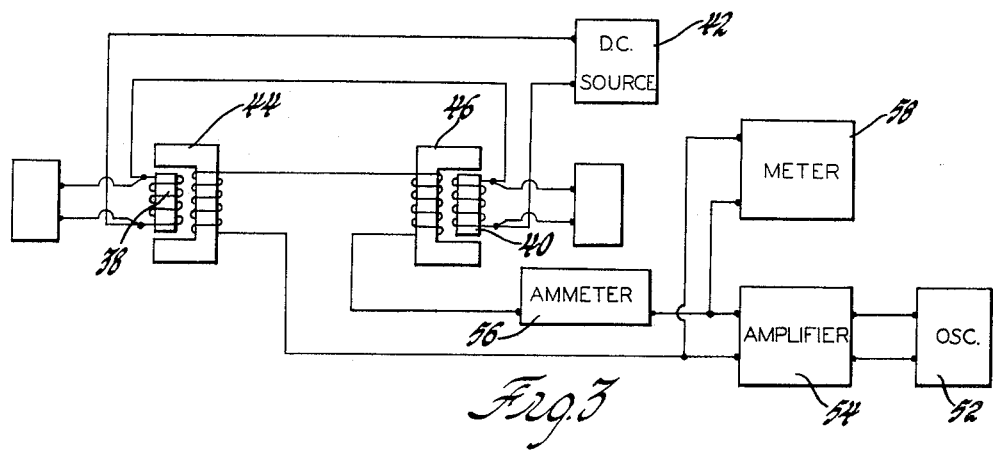
FIGURE 3 is a block diagram of the electrical circuitry for the FIGURE 2 apparatus.

The FIGURE 2 apparatus is somewhat similar to that of FIGURE 1 except that provision is made for measuring the rate of a torsion spring denoted by the numeral 10'. A support 36 for the spring 10' has suitable provision for clamping the lower end of the spring 10' thereto. The support 36 has two electromagnets 38 and 40 attached to the opposite and upper ends thereof. The electromagnets 38 and 40 are preferably energized by a D.C. source 42 as indicated in FIGURE 3. Permanent magnets similar to the magnet 14 in FIGURE 1 may be used in place of the electromagnets 38 and 40 if the magnetic forces provided by the permanent magnets are adequate. Coacting with the electromagnets 38 and 40 are electromagnets 44 and 46, respectively. Electromagnets 44 and 46 each have a U-shaped core that envelopes the opposite ends of the fixed electromagnets 38 and 40 in the manner displayed in FIGURE 3. These electromagnets 44 and 46 are each movable relative to the fixed magnets 38 and 40 and are joined to a drive plate 48. The drive plate 48 is connected to a spring adapter 50, which in turn is secured to the upper end of the torsion spring 10'. When the electromagnets 44 and 46 are energized by a pulsating current, the drive plate 48, the adapter 50, and accordingly the spring 10' will be twisted at the frequency of the pulsating current.

The pulsating current for energizing the electromagnets 44 and 46 is provided by an oscillator 52 having some predetermined frequency spectrum. As with the FIGURE 1 apparatus, the output from the oscillator 52 may be increased by an amplifier 54 prior to being supplied to the windings of the electromagnets 44 and 46. And similar to the FIGURE 1 apparatus, the FIGURE 2 apparatus includes an ammeter 56 and an events per time unit meter 58.

In the same way as the FIGURE 1 apparatus, the spring 10' is initially vibrated over the frequency spectrum provided by the oscillator 52 until the impedance of the spring 10' becomes minimum. At this time because the electrical impedance is maximum, the energizing current to the electromagnets 44 and 46 will be minimum, and accordingly the ammeter will show a minimum or null current reading. The frequency at which this occurs is read from the events per time unit meter 58 and corresponds to the natural frequency of the system with the spring 10'. After the natural frequency of this system is determined, a weight 60 of a known moment of inertia is positioned on the drive plate 48, and the natural frequency of this system with the spring 10' is determined in the aforementioned way. Again, the two natural frequency values and the inertia value of the weight 60 are substituted in Equation 8. The solution of Equation 8 with these values will provide the actual rate of the spring 10'.

From the foregoing, it will be appreciated that a method has been provided for determining the rate of either a linear spring or a torsional spring, particularly in those instances when the spring's rate could not otherwise be readily calculated. The method has been simplified to the extent that no special training is needed to operate the simple and inexpensive apparatus for accomplishing the different steps of the method. The unique apparatus is accurate and reliable and can be varied to meet changing conditions and requirements.

Although the invention has been described relative to springs, it should be kept in mind that other types of biasing devices can be analyzed by the apparatus; e.g. magnetic and electrostatic suspensions and externally pressurized bearing films.

The invention is to be limited only by the following claims.

We claim:

1. Apparatus for determining the rate of a biasing device in a biasing device mass system comprising vibratory support means for the biasing device, a weight of a known characteristic detachably joined to the biasing device system, a source of pulsating current variable over a certain frequency spectrum, means magnetically coupling the pulse source to the support means so as to vibrate the system at the frequencies of the pulse source, and means associated with said source of pulsating current indicating the natural frequency of the system both with and without the weight so as to enable the rate of the biasing device to be accurately determined.

2. Apparatus for determining the rate of a linear spring in a linear spring mass system comprising support means for vibrating the spring mass system along the length of the spring, a source of pulsating current variable over a certain frequency spectrum, means electromagnetically coupling the source to the support means so as to vibrate the spring mass system at the output frequency of the source, a weight of a known characteristic detachably joined to the spring mass system, and means indicating the natural frequency of the system both with and without the weight by measuring the frequency at which the pulsating current is minimum so as to enable the rate of the spring to be accurately determined.

3. Apparatus for determining the rate of a linear spring in a linear spring mass system comprising support means for vibrating the spring mass system along the length of the spring, an oscillator for providing an output current at a frequency that is variable over a certain frequency spectrum, electromagnetic means coupling the oscillator to the support means, the electromagnetic means including an electromagnet movable with the spring and energized by the output from the oscillator and a magnet fixed relative to the support means, the electromagnetic means causing the spring mass system to vibrate at a frequency corresponding to the output frequency from the oscillator, a weight of a known characteristic detachably joined to the spring mass system, and means indicating the natural frequency of the system both with and without the weight joined to the electromagnet by measuring the frequency at which current flow to the winding is minimum so as to enable the rate of the spring to be accurately determined.

4. Apparatus for determining the rate of a torsional spring in a torsional spring mass system comprising support means for permitting the spring mass system to be vibrated about the rotational axis of the spring, a source of pulsating current having a certain frequency spectrum, electromagnetic means coupling the source to the support means so as to vibrate the spring mass system at the frequency of the pulsating current from the source, a weight of a known characteristic detachably joined to the spring mass system, and means indicating the natural frequency of the system both with and without the weight by measuring the frequency at which the pulsating current supplied to the electromagnetic means is minimum so as to enable the rate of the spring to be accurately determined.

5. Apparatus for determining the rate of a torsional spring in a torsional spring mass system comprising support means for facilitating vibration of the spring mass system about the rotational axis of the spring, an oscillator having the output thereof variable over a certain frequency spectrum, electromagnetic means coupling the output of the oscillator to the support means so as to vibrate the spring at the output frequency of the oscillator, the electromagnetic means including a pair of fixed magnets relative to the support means, a pair of electromagnets adjacent the fixed magnets and movable with the spring, the pair of electromagnets being energized by the output from the oscillator so as to cause the spring mass system to be vibrated at a frequency corresponding to the output frequency from the oscillator, a weight of a known characteristic detachably joined to the spring mass system, and means indicating the natural frequency of vibration of the system both with and without the weight by measuring the frequency at which the current supplied to the windings is minimum so as to permit the rate of the spring to be accurately determined.

References Cited by the Examiner

UNITED STATES PATENTS

| | | | |
|---|---|---|---|
| 1,583,877 | 5/1926 | Hahnemann et al. | 73—67.4 |
| 2,782,633 | 2/1957 | Stauss et al. | 73—67.2 |
| 2,784,588 | 3/1957 | Humble et al. | 73—161 |
| 2,960,862 | 11/1960 | Spurr et al. | 73—67.2 |
| 3,040,563 | 6/1962 | Eckles et al. | 73—65 |

RICHARD C. QUEISSER, *Primary Examiner.*

JOSEPH P. STRIZAK, *Examiner.*